United States Patent
Yang et al.

(10) Patent No.: US 10,186,707 B2
(45) Date of Patent: Jan. 22, 2019

(54) METHODS OF MANUFACTURING GRAPHENE BASED MATERIAL

(71) Applicant: Graduate School at Shenzhen, Tsinghua University, Shenzhen (CN)

(72) Inventors: Quan-Hong Yang, Shenzhen (CN); Chen Zhang, Shenzhen (CN); Wei Lv, Shenzhen (CN); Xiao-Yu Zheng, Shenzhen (CN); Wei Wei, Shenzhen (CN); Ying Tao, Shenzhen (CN); Bao-Hua Li, Shenzhen (CN); Fei-Yu Kang, Shenzhen (CN)

(73) Assignee: Graduate School at Shenzhen, Tsinghua University, Shenzhen (CN)

( * ) Notice: Subject to any disclaimer, the term of this patent is extended or adjusted under 35 U.S.C. 154(b) by 0 days.

(21) Appl. No.: 15/907,294

(22) Filed: Feb. 28, 2018

(65) Prior Publication Data
US 2018/0190980 A1    Jul. 5, 2018

Related U.S. Application Data

(62) Division of application No. 14/315,327, filed on Jun. 26, 2014, now abandoned.

(30) Foreign Application Priority Data

| Jul. 5, 2013 | (CN) | 2013 1 0281343 |
| Jul. 5, 2013 | (CN) | 2013 1 0281899 |
| Jul. 5, 2013 | (CN) | 2013 1 0283526 |

(51) Int. Cl.

| C01B 32/192 | (2017.01) |
| H01M 4/36 | (2006.01) |
| H01B 1/04 | (2006.01) |
| H01M 4/13 | (2010.01) |
| H01M 4/139 | (2010.01) |
| H01M 4/38 | (2006.01) |
| H01M 4/62 | (2006.01) |
| H01M 4/04 | (2006.01) |
| H01M 10/052 | (2010.01) |

(52) U.S. Cl.
CPC .......... *H01M 4/366* (2013.01); *C01B 32/192* (2017.08); *H01B 1/04* (2013.01); *H01M 4/13* (2013.01); *H01M 4/139* (2013.01); *H01M 4/38* (2013.01); *H01M 4/625* (2013.01); *H01M 4/049* (2013.01); *H01M 10/052* (2013.01)

(58) Field of Classification Search
CPC ......... B82Y 30/00; B82Y 40/00; C01B 17/02; C01B 32/158; C01B 32/162; H01M 10/052; H01M 4/04; H01M 4/0497; H01M 4/38; H01M 4/625; C01P 2002/08; C01P 2004/04; C01P 2004/64; Y02P 60/122; Y02P 70/54
See application file for complete search history.

*Primary Examiner* — Richard M Rump
(74) *Attorney, Agent, or Firm* — ScienBiziP, P.C.

(57) ABSTRACT

A method for manufacturing graphene-based material is disclosed. A graphene oxide dispersion includes graphene oxide dispersed in solvent. A hydrogen sulfide gas is introduced to the graphene oxide dispersion at a reacting temperature to achieve a graphene dispersion. The hydrogen sulfide reduces graphene oxide into graphene, and elemental sulfur produced from the hydrogen sulfide is deposited on surfaces of the graphene. The solvent and elemental sulfur are removed to achieve a graphene composite material.

15 Claims, 8 Drawing Sheets

METHODS OF MANUFACTURING GRAPHENE BASED MATERIAL

CROSS-REFERENCE TO RELATED APPLICATIONS

This is a continuation application of Ser. No. 14/315,327, filed on Jun. 26, 2014, and claims all benefits accruing under 35 U.S.C. § 119 from China Patent Applications No. 201310283526.0, filed on Jul. 5, 2013, No. 201310281343.5, filed on Jul. 5, 2013, and No. 201310281899.4, filed on Jul. 5, 2013 in the China Intellectual Property Office, the contents of which are hereby incorporated by reference.

FIELD

The present disclosure relates to graphene composite materials, methods for manufacturing graphene and graphene composite materials, and lithium sulfur batteries.

BACKGROUND

Graphene is an allotrope of carbon with a structure of one-atom-thick planar sheets of $sp^2$-bonded carbon atoms that are densely packed in a honeycomb crystal lattice. Because of its high conductivity, thermal stability, mechanical strength, and special quantum characteristics, graphene is considered to be an alternative to silicon in the future. Methods for producing graphene include mechanical peeling methods, chemical vapor deposition methods, and chemical reduction methods. Because it is simple and easy for mass production, chemical reduction methods are often used. A basic process of a chemical reduction method includes oxidation of the graphite powder into graphite oxide powder, peeling of the graphite oxide powder in a solvent to form graphene oxide, and reduction of the graphene oxide into graphene. The reducing agent is a key factor of the chemical reduction method. Some common reducing agents for graphene preparation are hydrazine, hydrazine hydrate, hydrazine derivatives, ethylenediamine, amino acids, sodium boron hydride, vitamin C, phenolphthalein, and the like.

Lithium-sulfur batteries have attracted much attention for their high-energy secondary green chemical power in recent years.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

Figure 1:
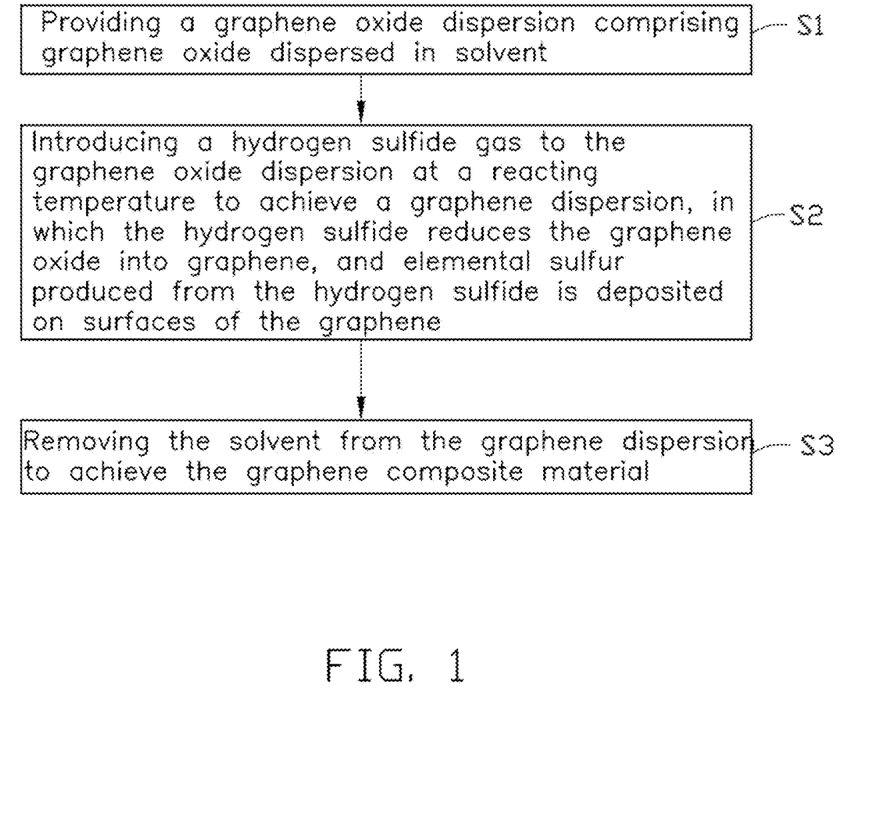
FIG. 1 shows a flowchart of one exemplary embodiment of a method for manufacturing graphene composite powder.

Referring to FIG. 1, one exemplary embodiment of a method for manufacturing graphene composite material includes the following steps:

S1, providing a graphene oxide dispersion comprising graphene oxide dispersed in solvent;

S2, introducing a hydrogen sulfide gas to the graphene oxide dispersion at a reacting temperature to achieve a graphene dispersion, in which the hydrogen sulfide reduces the graphene oxide into graphene, and elemental sulfur produced from the hydrogen sulfide is deposited on surfaces of the graphene; and S3, removing the solvent from the graphene dispersion to achieve the graphene composite material.

In step S1, the graphene oxide dispersion includes a plurality of graphene oxide sheets dispersed in a liquid solvent. In one exemplary embodiment, the graphene oxide sheet is a single layer of graphene oxide or 2-10 layers of graphene oxide laminated together. The solvent can be selected from water, ethanol, isopropanol, ethylene glycol, N,N-dimethylformamide (DMF), N-methylpyrrolidone (NMP), tetrahydrofuran, and any combination thereof. Other solvents that properly disperse the graphene oxide sheets can also be used. In one embodiment, the solvent is not chemically reactive to the graphene and graphene oxide. A concentration of the graphene oxide in the graphene oxide dispersion can be in a range from about 0.05 milligrams per milliliter (mg/mL) to about 30 mg/mL, and is about 1-5 mg/mL in one embodiment. In step S2, the hydrogen sulfide gas can be directly introduced, and can be only the hydrogen sulfide gas directly introduced to the graphene oxide dispersion at a redox reacting temperature, the graphene dispersion is achieved through a redox reaction between the graphene oxide and the hydrogen sulfide gas.

The graphene oxide dispersion can be prepared by the following steps:

S11, providing graphite oxide powder; and

S12, dispersing the graphite oxide powder in the solvent to prepare the graphene oxide dispersion.

In step S12, the graphite oxide powder can be uniformly dispersed in the solvent by ultrasonic dispersing and/or stirring, during which the graphene oxide layers of the graphite oxide separate from each other to form a plurality of graphene oxide sheets dispersed in the solvent. In one embodiment, 300 mg of graphite oxide is added to 100 mL of deionized water and is ultrasonically treated with a power of about 200 watts (W) for about 2.5 hours to achieve the graphene oxide dispersion with a concentration of 3 mg/mL.

In another exemplary embodiment, the graphene oxide sheets can be directly obtained and dispersed in the solvent.

In step S2, hydrogen sulfide gas is used as a reducing agent to reduce the graphene oxide sheets into graphene sheets. In one embodiment, the graphene sheet is a single layer of graphene or 2-10 layers of graphene laminated together. During the reduction of the graphene oxide, elemental sulfur and water are produced. The produced elemental sulfur can be adsorbed to surfaces of the reduced graphene sheets to form the graphene composite material. An amount of the introduced hydrogen sulfide gas can be adjusted by a number of the graphene oxide sheets in the dispersion, and a desired amount of the elemental sulfur in the graphene composite material.

A reacting temperature for a redox reaction between the graphene oxide and the hydrogen sulfide gas can be below a boiling point of the solvent and below an autoignition temperature of the hydrogen sulfide, to prevent or reduce loss of the solvent and hydrogen sulfide during the redox reaction. Specifically, the reacting temperature for a reducing step of the redox reaction can be in a range from about 5 degrees Celsius (° C.) to about 260° C. When the solvent is water, the reacting temperature can be in a range from about 5° C. to about 100° C. In one embodiment, the reacting temperature is about 75° C.

During introduction of the hydrogen sulfide gas, the graphene oxide dispersion can be ultrasonically vibrated or stirred to achieve a uniform graphene dispersion, in which the graphene oxide sheets are reduced into graphene sheets uniformly dispersed in the solvent. The elemental sulfur formed in the reaction is formed directly on surfaces of the graphene sheets.

In one exemplary embodiment, the method for manufacturing the graphene composite material further includes a step of introducing a sulfur dioxide ($SO_2$) gas to the graphene dispersion at room temperature after step S2. After step S2, redundant hydrogen sulfide can be adsorbed on the surfaces of the graphene sheets. The redundant hydrogen sulfide can react with the sulfur dioxide following the equation of $2H_2S+SO_2=2H_2O+3S$ to form additional elemental sulfur. Thus, the amount of elemental sulfur formed on the graphene sheets can increase.

In step S3, to prevent sublimation of the elemental sulfur, the graphene dispersion can be dried at a relatively low temperature (e.g., below a sublimation point of elemental sulfur under a predetermined pressure). In one embodiment, step S3 can be freeze-drying the graphene dispersion to remove the solvent at a temperature in a range from about −196° C. to about 0° C. for about 2 hours to about 96 hours. In one embodiment, the temperature for freeze-drying is about −60° C. to 0° C., and the time is about 4 hours to about 12 hours. In one embodiment, the temperature of freeze-drying is about −56° C.

In another exemplary embodiment, the graphene dispersion can be dried at room temperature to volatilize the solvent. In yet another embodiment, the graphene dispersion can be dried by a supercritical drying method. In some other embodiments, the graphene dispersion can be dried by heating in a vacuum, heating in air, heating in a protective gas or any other drying methods.

The achieved graphene composite material obtained from the above-described drying methods can be in powder form, especially from the freeze-drying method.

Figure 2:
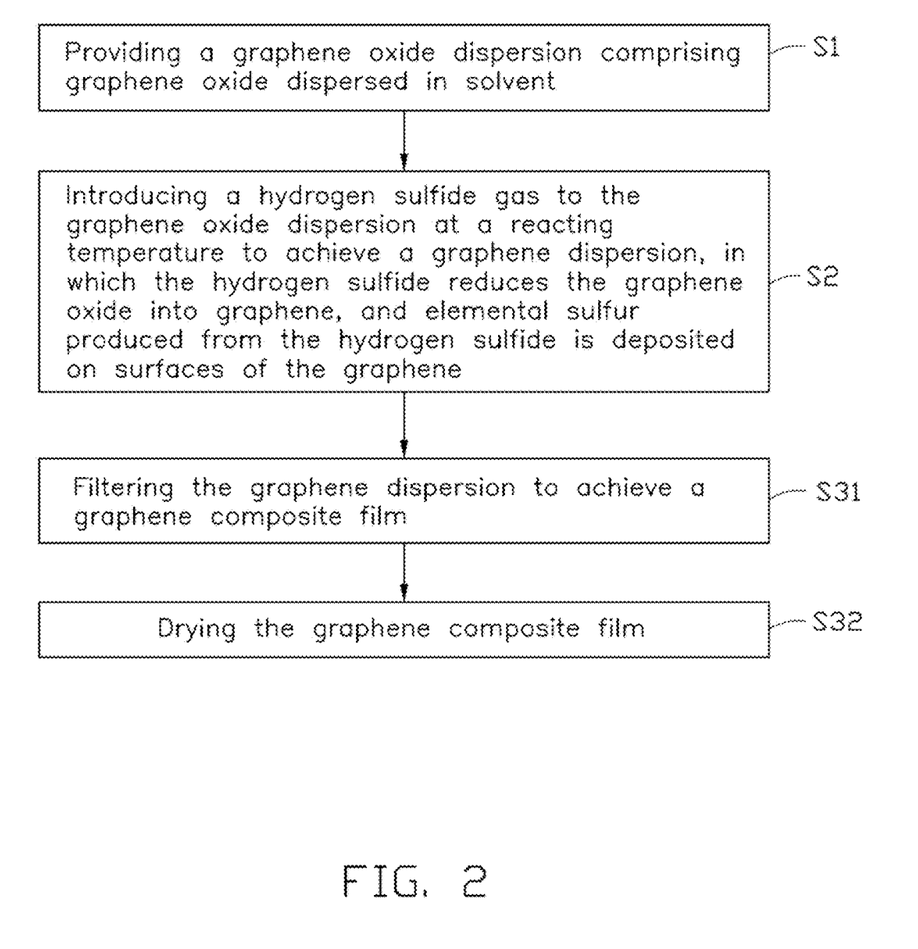
FIG. 2 shows a flowchart of one exemplary embodiment of a method for manufacturing graphene composite film.

Referring to FIG. 2, in another exemplary embodiment, step S3 includes substeps S31 of filtering the graphene dispersion to achieve a graphene composite film; and substep S32 of drying the graphene composite film. In substep S31, a graphene composite film can be formed on a filter by filtering the graphene dispersion. A thickness of the graphene composite film can be adjusted by adjusting filtration time, and concentration of the graphene dispersion. In substep S32, the graphene composite film can be further dried by the above-described drying methods at a relatively low temperature to remove residual solvent in the film. In one embodiment, the graphene composite film is freeze-dried at about −57° C.

Figure 3:
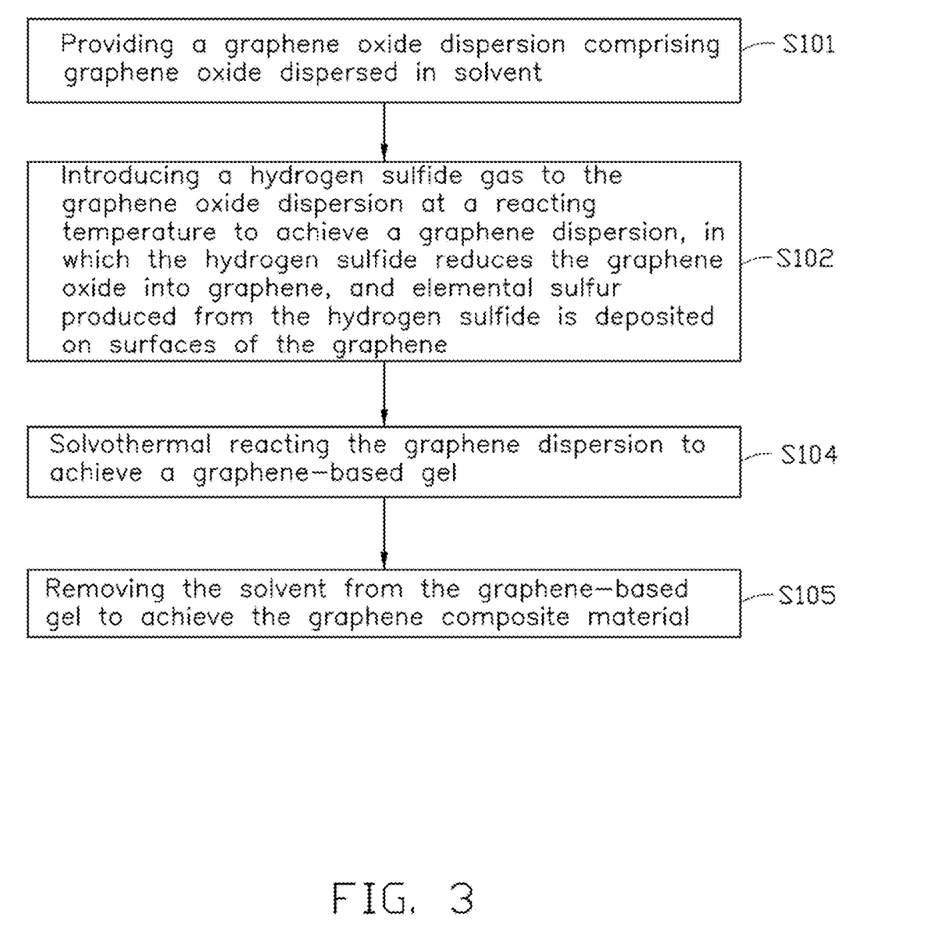
FIG. 3 shows a flowchart of one exemplary embodiment of a method for manufacturing three-dimensional porous graphene composite material.

Referring to FIG. 3, another exemplary embodiment of the method for manufacturing graphene composite material includes the following steps:

S101, providing a graphene oxide dispersion comprising graphene oxide dispersed in solvent;

S102, introducing a hydrogen sulfide gas to the graphene oxide dispersion to achieve a graphene dispersion, in which the hydrogen sulfide reduces the graphene oxide into graphene, and elemental sulfur produced from the hydrogen sulfide is deposited on surfaces of the graphene;

S104, solvothermal reacting the graphene dispersion to achieve a graphene-based gel; and S105, removing the solvent from the graphene-based gel to achieve the graphene composite material.

Steps S101 and S102 are the same as steps S1 and S2 in the embodiment described above.

In one embodiment, the method for manufacturing the graphene composite material further includes a step of introducing a sulfur dioxide gas to the graphene dispersion at room temperature after step S102, to increase the amount of elemental sulfur formed on the graphene sheets.

In step S104, a solvothermal reaction can be processed at a temperature from about 50° C. to about 360° C. for about 0.1 hour to about 120 hours. In one embodiment, the graphene dispersion is solvothermally reacted at about 70° C. to about 200° C. for about 2 hours to about 48 hours. Specifically, the graphene dispersion is filled in a solvothermal reactor, such as a sealed autoclave. The solvothermal reactor is heated, and a vapor of the solvent in the solvothermal reactor can be generated to increase a pressure inside the solvothermal reactor. During the solvothermal reaction, the graphene sheets, having sulfur formed thereon, overlap and join with each other to form a three-dimensional porous graphene-based gel. In one embodiment, the graphene dispersion is solvothermally reacted at a temperature of about 150° C. for about 6 hours to obtain the graphene-based gel.

In step S105, removing the solvent of the graphene-based gel can be the same as the above-described step S3. During drying of the graphene-based gel, the solvent is removed, and a three-dimensional porous graphene composite material is obtained. In one embodiment, the graphene based gel is freeze-dried at a temperature of about −196° C. to 0° C. In one embodiment, the temperature for freeze-drying is about −60° C. to about 0° C. In another embodiment, the temperature of freeze-drying is about −56° C. The freeze-drying can remove the solvent quickly and form a porous structure of the graphene-based gel to form the three-dimensional porous graphene composite material. The three-dimensional porous graphene composite material is an aerogel.

Figure 4:
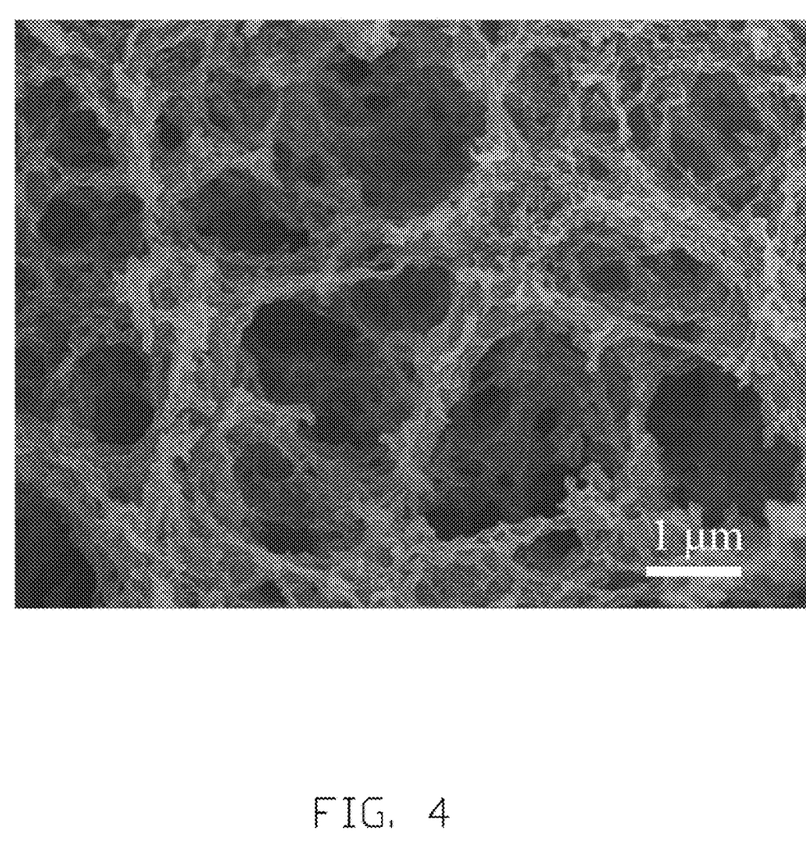
FIG. 4 shows a scanning electron micrograph (SEM) image of one exemplary embodiment of graphene composite material.

Referring to FIG. 4, the graphene composite material includes a three-dimensional porous graphene macrostructure, and elemental sulfur deposited on surfaces of the three-dimensional porous graphene macrostructure. The elemental sulfur can be mono-particles or multi-particles formed in pores of the three-dimensional porous graphene macrostructure. The three-dimensional porous graphene macrostructure can be a free-standing structure made of a plurality of graphene sheets overlapped and joined with each other to form a network structure. A plurality of pores is defined between the plurality of graphene sheets. A pore volume of the three-dimensional porous graphene macrostructure can be about 0.05 centimeters-cubed per gram ($cm^3/g$) to about 5.2 $cm^3/g$. A pore size distribution can be about 0.4 nanometers (nm) to about 10 micrometers (μm). In one embodiment, the pore volume of the three-dimensional porous graphene macrostructure is about 0.1 $cm^3/g$ to about 3 $cm^3/g$, and the pore size distribution is about 1 nm to about 5 μm. In the graphene composite material, the elemental sulfur is adsorbed to the surfaces of the three-dimensional porous graphene macrostructure by van der Waals attractive forces and also by chemical bonds therebetween. Thus, a stable bond between the sulfur and the graphene sheets can be formed, which is a good property for graphene composite material in cathode electrodes of lithium sulfur batteries.

In the graphene composite material, a mass percentage of the elemental sulfur can be in a range from about 5% to about 95%. A ratio between the elemental sulfur and the graphene can be adjusted by adjusting an amount of the hydrogen sulfide introduced in the graphene oxide dispersion. In one embodiment, the elemental sulfur has a mass percentage of about 45%, and the graphene has a mass percentage of about 55% in the graphene composite material.

In the graphene composite material, the three-dimensional porous graphene macrostructure is a carrier of the elemental sulfur and a conducting agent. The three-dimensional porous graphene macrostructure can adsorb sulfur and allow the sulfur to be uniformly deposited in the graphene composite material. In another aspect, the graphene has superior conductivity and can provide a conducting network in electrode material of the lithium sulfur battery. Further, the three-dimensional porous graphene macrostructure can prevent polysulfide formed during cycling of the sulfur lithium battery from transferring to an anode electrode.

Figure 5:
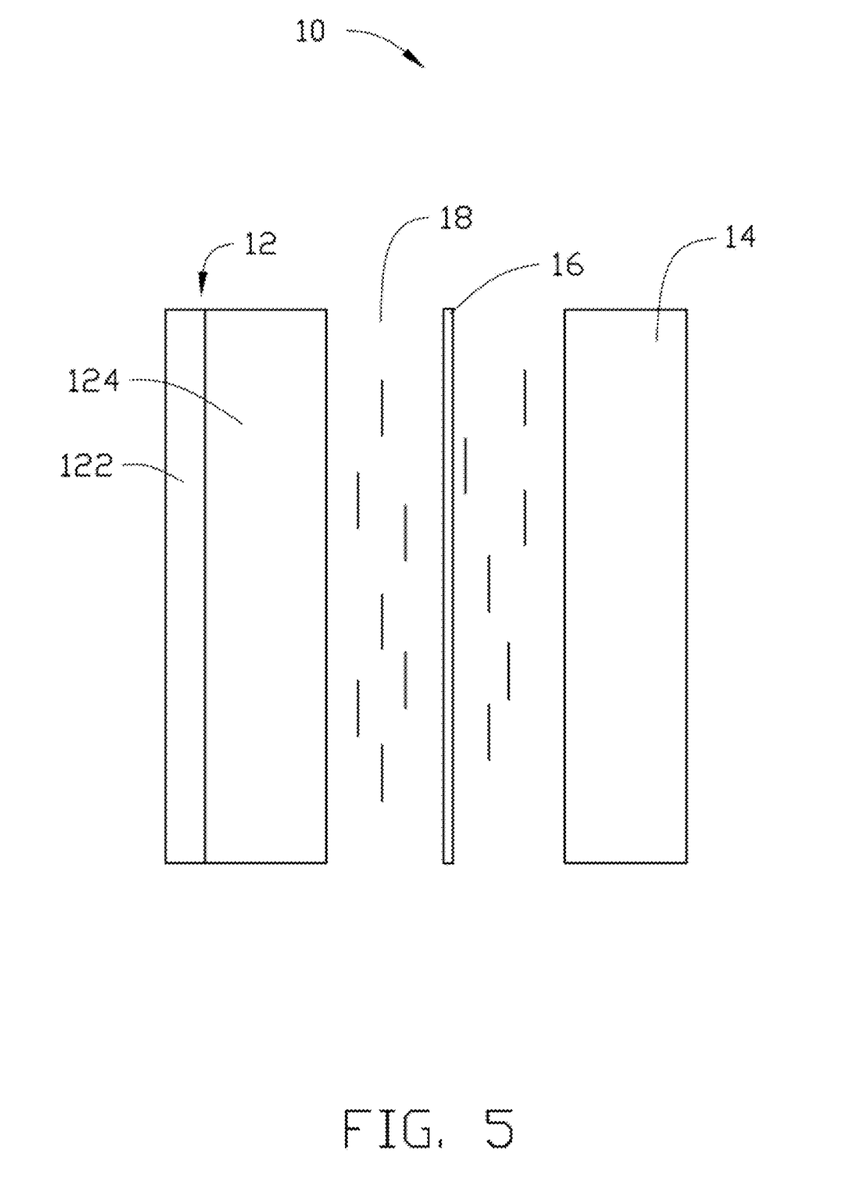
FIG. 5 shows a schematic drawing illustrating a structure of one exemplary embodiment of a lithium sulfur battery.

Referring to FIG. 5, one exemplary embodiment of a lithium sulfur battery 10 using the above-described graphene composite material includes a cathode electrode plate 12, an anode electrode plate 14, a separator 16, and an electrolyte 18. The cathode electrode plate 12 includes a cathode current collector 122 and a cathode material layer 124 located on the cathode current collector 122. The cathode material layer 124 is made of the graphene composite material including a three-dimensional porous graphene macrostructure and a plurality of elemental sulfur deposited on the three-dimensional porous graphene macrostructure. The cathode current collector 122 can be aluminum foil, nickel foil, stainless steel, or carbon-coated aluminum foil, for example. The anode electrode plate 14 can be a lithium metal plate, lithium alloy plate, or lithium-carbon composite plate. The electrolyte 18 can be bis(trifluoromethanesulfonyl)imide (LiTFSI) and/or lithium hexafluorophosphate (LiPF6), for example. The electrolyte 18 can be dissolved in a solvent to form an electrolytic solution. The solvent can be ethers, such as triethylene glycol dimethyl ether (TEGDME), dimethyl ether (DME), or the like. The separator 16 can be polypropylene (PP) porous film, polyethylene (PE) porous film, or propylene and ethylene copolymer film.

Figure 6:
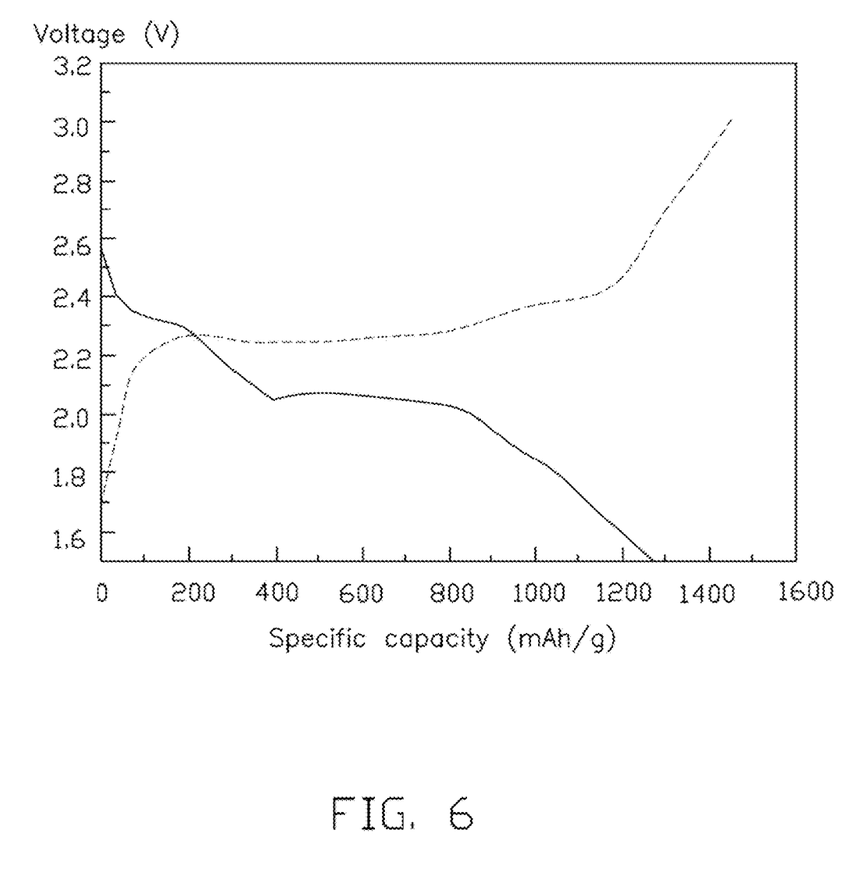
FIG. 6 shows a charge-discharge curve of a first cycle of one exemplary embodiment of the lithium sulfur battery.

In one exemplary embodiment of the lithium-sulfur battery, aluminum foil is used as the cathode current collector, lithium metal is used as the anode electrode plate, and polypropylene porous film is used as the separator. The liquid electrolyte solution is obtained by dissolving LiTFSI in a 1:1 volume ratio of 1,3-dioxolane (DOL) and DME to obtain a 1.5 moles per liter (mol/L) solution. Referring to FIG. 6, an initial discharge capacity of the lithium sulfur battery is about 1300 milliampere-hours per gram (mAh/g).

Figure 7:
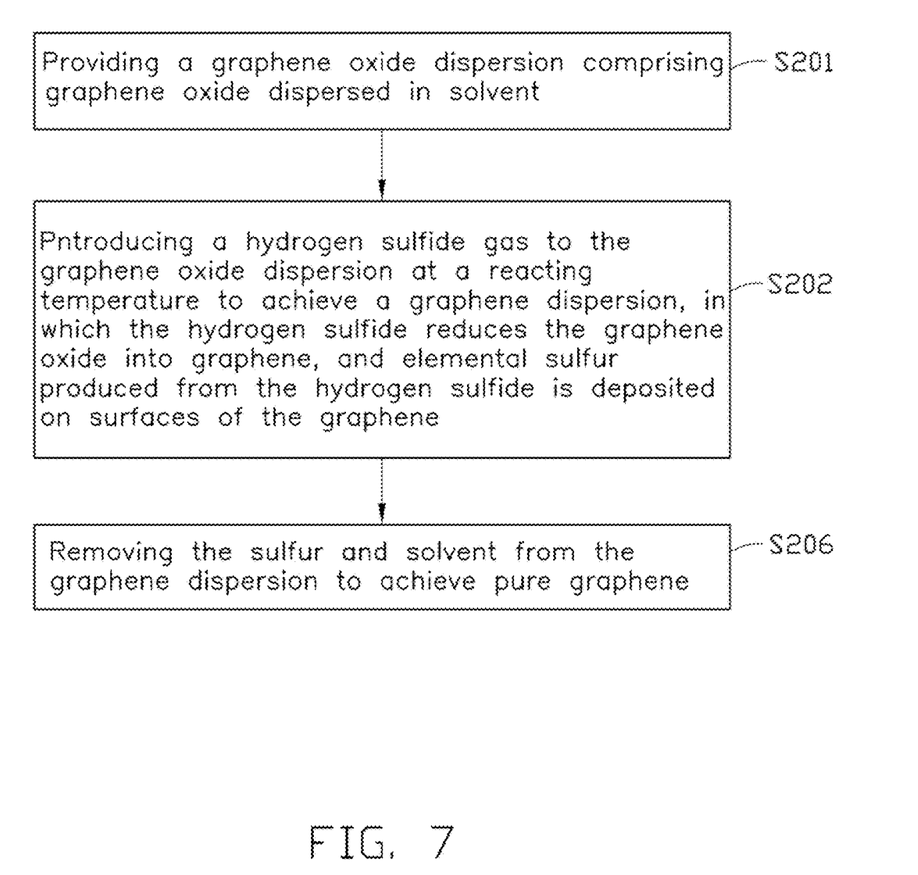
FIG. 7 shows a flowchart of one exemplary embodiment of a method for manufacturing graphene.

Referring to FIG. 7, one embodiment of a method for manufacturing graphene includes the following steps:

S201, providing a graphene oxide dispersion comprising graphene oxide dispersed in solvent;

S202, introducing a hydrogen sulfide gas to the graphene oxide dispersion to achieve a graphene dispersion, in which the hydrogen sulfide reduces the graphene oxide into graphene, and elemental sulfur produced from the hydrogen sulfide is deposited on surfaces of the graphene; and S206, removing the sulfur and solvent from the graphene dispersion to achieve pure graphene.

Steps S201 and S202 are the same as steps S1 and S2 in the embodiments described above.

In step S206, the sulfur can be removed from the graphene sheets by a thermal treatment step, which evaporates the elemental sulfur from the surfaces of the graphene. A temperature for the thermal treatment step can be in a range from about 150° C. to about 1000° C. A duration of time for the thermal treatment step can be in a range from about 0.5 hours to about 72 hours. In one embodiment, the temperature is about 200° C. to about 600° C., and the duration of time is about 2 hours to about 12 hours. The thermal treatment step can be processed in air, protective gas, or vacuum. In the protective gas and vacuum, the graphene can be protected from being oxidized at a relatively higher temperature.

In one exemplary embodiment, due to the thermal treatment step in step S206, the sulfur and solvent can be evaporated from the graphene dispersion simultaneously.

In another exemplary embodiment, the sulfur can be removed from the graphene sheets by a washing step using an organic liquid to dissolve the sulfur on the graphene sheets. The organic liquid can dissolve elemental sulfur and can be selected from carbon disulfide, carbon tetrachloride, benzene, toluene, and any combination thereof, for example. Thus, step S206 can further include a solvent-removing step.

Figure 8:
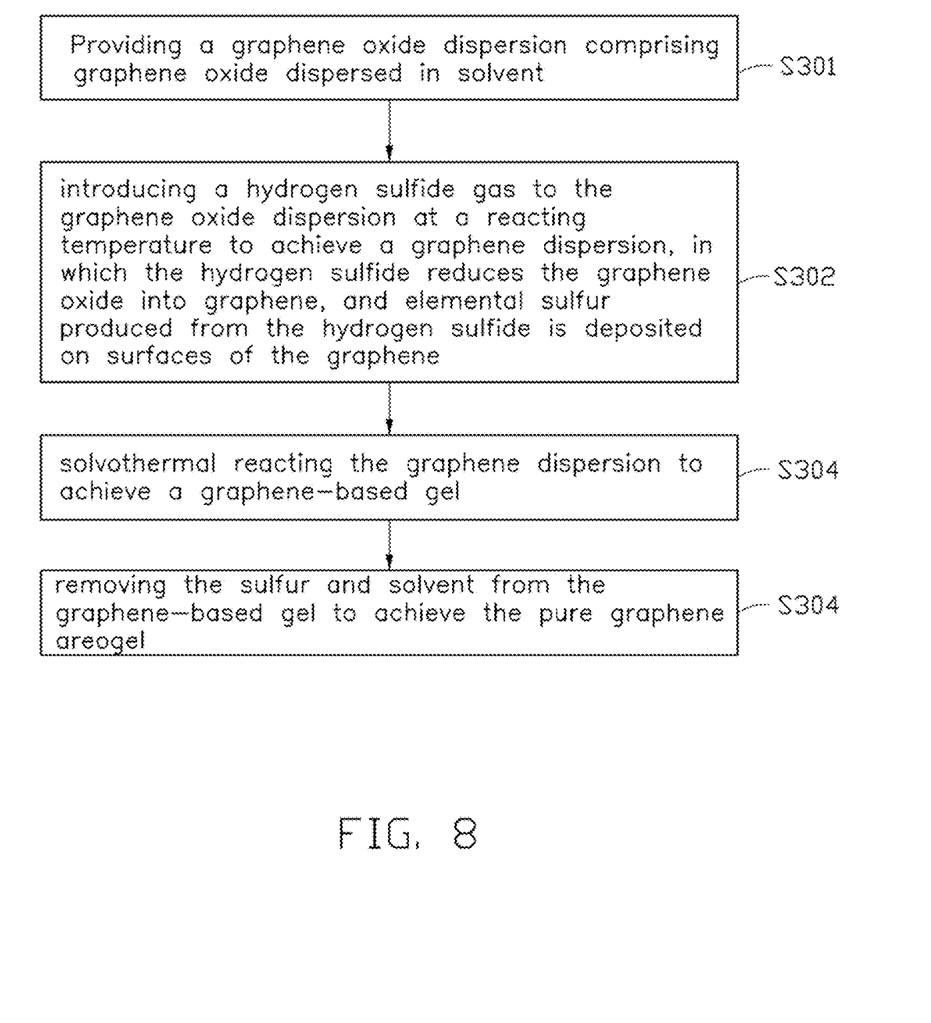
FIG. 8 shows a flowchart of another exemplary embodiment of a method for manufacturing graphene.

Referring to FIG. 8, another exemplary embodiment of a method for manufacturing graphene includes the following steps:

S301, providing a graphene oxide dispersion comprising graphene oxide dispersed in solvent;

S302, introducing a hydrogen sulfide gas to the graphene oxide dispersion to achieve a graphene dispersion, in which the hydrogen sulfide reduces the graphene oxide into graphene, and elemental sulfur produced from the hydrogen sulfide is deposited on surfaces of the graphene;

S304, solvothermally reacting the graphene dispersion to achieve a graphene-based gel; and S307, removing the sulfur and solvent from the graphene-based gel to achieve the pure graphene aerogel.

Steps S301, S302, and S304 are the same as steps S1, S2, and S4 in the embodiments described above. In one embodiment, about 200 mg of graphite oxide is added to about 100 mL of deionized water and ultrasonically treated with a power of about 150 W for about 2 hours to achieve the graphene oxide dispersion with a concentration of about 2 mg/mL.

Step S307 is similar to the above-described step S206. The solvent can be removed from the graphene-based gel during the thermal treatment step of the graphene based gel for removing the sulfur. In another embodiment, the solvent can be removed by the above described drying step of step S3 after the washing step of the graphene-based gel as described above.

By using the solvothermal reaction, a free-standing three-dimensional porous graphene macrostructure can be obtained. The three-dimensional porous graphene macrostructure includes a plurality of graphene sheets overlapped and joined with each other to form a network structure. That is, the three-dimensional porous graphene macrostructure can be an aerogel. A plurality of pores is defined between the plurality of graphene sheets. A pore volume of the three-dimensional porous graphene macrostructure can be about 0.05 cm$^3$/g to about 5.2 cm$^3$/g. A pore size distribution of the pores can be about 0.4 nm to about 10 μm. In one embodiment, the pore volume of the three-dimensional porous graphene macrostructure is about 0.1 cm$^3$/g to about 3 cm$^3$/g, and the pore size distribution is about 1 nm to about 5 μm.

In the present methods for manufacturing graphene, hydrogen sulfide is used as the reducing agent of the graphene oxide, which can achieve a high-quality graphene material easily and produce elemental sulfur.

Depending on the exemplary embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for manufacturing graphene based material comprising:

providing a graphene oxide dispersion comprising graphene oxide dispersed in solvent;

directly introducing a hydrogen sulfide gas to the graphene oxide dispersion at a redox reacting temperature to achieve a graphene dispersion, the graphene dispersion is achieved through a redox reaction between the graphene oxide and the hydrogen sulfide gas, wherein the hydrogen sulfide reduces graphene oxide into graphene, and elemental sulfur produced from the hydrogen sulfide is deposited on surfaces of the graphene; and removing solvent and sulfur to achieve a pure graphene based material.

2. The method of claim 1, wherein the redox reacting temperature is in a range from about 5° C. to about 260° C.

3. The method of claim 1, wherein the removing the solvent comprises freeze-drying the graphene dispersion.

4. The method of claim 1, wherein removing the solvent comprises at least one of evaporating the solvent from the graphene dispersion at room temperature, vacuum heating, heating at atmosphere, being in a protective gas, and supercritical drying.

5. The method of claim 1, wherein the solvent is selected from a group consisting of water, ethanol, isopropanol, ethylene glycol, N,N-dimethylformamide, N-methylpyrrolidone, tetrahydrofuran, and combinations thereof.

6. The method of claim 1, wherein a concentration of graphene oxide in the graphene oxide dispersion is in a range from about 0.05 mg/mL to about 30 mg/mL.

7. The method of claim 1, wherein removing the solvent from the graphene dispersion comprising filtering the graphene dispersion to achieve a graphene composite film.

8. The method of claim 1 further comprising: solvothermal reacting, before removing solvent and sulfur, the graphene dispersion to achieve a graphene-based gel comprising a three dimensional porous graphene macrostructure and elemental sulfur deposited on surfaces and pores of the three dimensional porous graphene macrostructure, the three dimensional porous graphene macrostructure being a free-standing structure.

9. The method of claim 8, wherein the solvothermal reacting is processed at a temperature from about 50° C. to about 360° C. for about 0.1 hours to about 120 hours.

10. The method of claim 1, wherein removing the elemental sulfur comprises a thermal treatment to evaporate the elemental sulfur from the surface of the graphene at a temperature from about 150° C. to about 1000° C.

11. The method of claim 1, wherein removing the elemental sulfur comprises a washing using an organic liquid to dissolve the elemental sulfur on the surface of the graphene.

12. The method of claim 11, wherein the organic liquid is selected from a group consisting of carbon disulfide, carbon tetrachloride, benzene, toluene, and combinations thereof.

13. The method of claim 1, wherein a mass percentage of the elemental sulfur is controlled in a range of 5% to 95% by controlling an amount of the introduced hydrogen sulfide gas.

14. The method of claim 8, wherein a pore volume of the three dimensional porous graphene macrostructure is controlled in a range of 0.05 cm$^3$/g to 5.2 cm$^3$/g.

15. The method of claim 14, wherein a pore size distribution is controlled in a range from 0.4 nm to 10 μm.

* * * * *